(12) United States Patent
Shibayama et al.

(10) Patent No.: US 11,658,596 B2
(45) Date of Patent: May 23, 2023

(54) MOTOR CONTROL DEVICE AND AIR CONDITIONER

(71) Applicants: KABUSHIKI KAISHA TOSHIBA, Tokyo (JP); TOSHIBA CARRIER CORPORATION, Kawasaki (JP)

(72) Inventors: Takeshi Shibayama, Tokyo (JP); Mariko Kuboi, Tokyo (JP); Toshimitsu Aizawa, Tokyo (JP); Naohito Kamiya, Fuji (JP); Yoshitaka Uchiyama, Fuji (JP)

(73) Assignees: KABUSHIKI KAISHA TOSHIBA, Tokyo (JP); TOSHIBA CARRIER CORPORATION, Kawasaki (JP)

( * ) Notice: Subject to any disclaimer, the term of this patent is extended or adjusted under 35 U.S.C. 154(b) by 0 days.

(21) Appl. No.: 17/663,876

(22) Filed: May 18, 2022

(65) Prior Publication Data

US 2023/0045429 A1     Feb. 9, 2023

(30) Foreign Application Priority Data

Aug. 5, 2021   (JP) ............... JP2021-129010

(51) Int. Cl.
    *H02P 21/18*    (2016.01)
    *F24F 11/30*    (2018.01)
    (Continued)

(52) U.S. Cl.
    CPC ............. *H02P 21/18* (2016.02); *F24F 11/30* (2018.01); *H02K 11/30* (2016.01); *H02P 6/08* (2013.01); *H02P 25/022* (2013.01)

(58) Field of Classification Search
    CPC .......... H02P 21/18; H02P 6/08; H02P 25/022; H02K 11/30; F24F 11/30
    See application file for complete search history.

(56) References Cited

U.S. PATENT DOCUMENTS

| | | | |
|---|---|---|---|
| 9,444,382 B2* | 9/2016 | Zhao | H02P 21/06 |
| 2014/0176028 A1* | 6/2014 | Tobari | B60L 3/003 |
| | | | 318/400.15 |
| 2015/0381092 A1* | 12/2015 | Wang | H02P 21/12 |
| | | | 318/400.02 |

FOREIGN PATENT DOCUMENTS

| | | |
|---|---|---|
| JP | 5175887 B2 | 4/2013 |
| JP | 2018-93572 A | 6/2018 |

\* cited by examiner

*Primary Examiner* — Zoheb S Imtiaz
(74) *Attorney, Agent, or Firm* — Maier & Maier, PLLC

(57) ABSTRACT

A motor control device of an embodiment includes a power supply unit that supplies AC power to a motor; a current detection unit that detects a current flowing through a winding of the motor; a speed and electric angle estimation unit that estimates a rotation speed and an electric angle of the motor based on a voltage outputted by the power supply unit and the current; a coordinate conversion unit that obtains an excitation current and a torque current based on the current and the electric angle; a torque current command determination unit that substitutes a predicted torque calculated based on a mechanical motion equation into a torque component current command value calculated based on a torque expression of a vector control coordinate, to generate a torque component current command value for bringing a difference between an inputted speed command and an estimated speed closer to zero; and a model prediction control unit that applies, to a plurality of predicted currents including a current change ratio determined depending on each of a plurality of switching patterns based on a space voltage vector that are able to be outputted by the power supply unit, an evaluation function to evaluate a size of a difference from a predicted current corresponding to each of the torque component current command value and an exci- (Continued)

tation component current command value inputted from outside, and that selects and outputs a switching pattern.

6 Claims, 16 Drawing Sheets

(51) Int. Cl.
*H02P 6/08* (2016.01)
*H02P 25/022* (2016.01)
*H02K 11/30* (2016.01)

| VOLTAGE VECTOR | PHASE VOLTAGE | | |
|---|---|---|---|
| | Vu | Vv | Vw |
| V1 | 2/3Vdc | −1/3Vdc | −1/3Vdc |
| V2 | 1/3Vdc | 1/3Vdc | −2/3Vdc |
| V3 | −1/3Vdc | 2/3Vdc | −1/3Vdc |
| V4 | −2/3Vdc | 1/3Vdc | 1/3Vdc |
| V5 | −1/3Vdc | −1/3Vdc | 2/3Vdc |
| V6 | 1/3Vdc | −2/3Vdc | 1/3Vdc |
| V0,V7 | 0 | 0 | 0 |

FIG. 5

MOTOR CONTROL DEVICE AND AIR CONDITIONER

BACKGROUND OF THE INVENTION

Field of the Invention

Embodiments of the present invention relate to a motor control device that controls a motor in a position-sensorless method, and an air conditioner including the motor control device that controls the motor to drive a compressor.

Description of the Related Art

For example, in a case of using a brushless DC motor as a motor of a compressor, the motor may be controlled by estimating a rotation speed and position of the motor by a position-sensorless method, changing a current command or a voltage command if there is a difference between the estimated rotation speed and a target rotation speed, and adjusting the rotation speed of the motor to the target rotation speed.

FIG. 15 shows a cross-sectional structure of a 1-cylinder rotary compressor. In a mechanism of the compressor, as shown in FIG. 16, load fluctuation occurs depending on a rotation machine angle of a compressor motor. Due to this load fluctuation, unevenness occurs in the rotation speed during one rotation of the motor at the machine angle, which leads to generation of vibration and noise. When an operation of the compressor is continued in an uneven state of the rotation speed of the motor, for example, a piping to transport refrigerant or the like is stressed in an air conditioner, thereby reducing life of such parts. Therefore, when controlling the rotation of the motor, torque control is performed, and the occurrence of the unevenness in the rotation speed with the load fluctuation needs to be inhibited.

As a conventional technology of performing the torque control for such a purpose, Patent Literature 1 (Japanese Patent No. 5175887) discloses a technology configured as follows. The configuration includes estimating a load torque generated by a compressor from a torque current, a motor constant and a moment of inertia of a motor including a compression unit of the compressor, calculating a phase of cyclic fluctuation indicated by the load torque, determining a sinusoidal torque correction current based on the load torque phase, and adjusting an amplitude and phase of the torque correction current to decrease motor speed fluctuation. Also, Patent Literature 2 (Japanese Patent Laid-Open No. 2018-093572) discloses a technology of compensating for a torque command value by a load torque estimated by a disturbance observer and a determined parameter related to drive of a motor.

However, in such technologies as in Patent Literatures 1 and 2, proportional integral control is used in speed control and current control, and hence a current command or a voltage command is gradually determined. Specifically, delay occurs in feedback control due to use of past information, and hence responsiveness to the control is low. Furthermore, when estimating a position of the motor by use of a position-sensorless method, precise torque control cannot be executed due to drop in accuracy of estimation of the motor position or speed. Therefore, there is concern that speed fluctuation cannot be sufficiently suppressed, in a case where the torque fluctuation occurs in a noticeably short cycle.

BRIEF DESCRIPTION OF THE DRAWINGS

FIG. 5 is a table showing a relation between each voltage vector and a phase voltage;

DETAILED DESCRIPTION OF THE EMBODIMENTS

According to embodiments, a motor control device is provided which can follow a target speed at a high speed when applying motor control by a position-sensorless method to a system where it is assumed that comparatively large load fluctuation occurs, and an air conditioner including the motor control device is also provided.

A motor control device of an embodiment includes a power supply unit that supplies AC power to a motor to drive a load; a current detection unit that detects a current flowing through a winding of the motor; a speed and electric angle estimation unit that estimates a rotation speed and an electric angle of the motor based on a voltage outputted by the power supply unit and the current; a coordinate conversion unit that obtains an excitation current and a torque current based on the current and the electric angle; a torque current command determination unit that substitutes a predicted torque calculated based on a mechanical motion equation into a torque component current command value calculated based on a torque expression of a vector control coordinate of a permanent magnet synchronous motor, to generate a torque component current command value for bringing a difference between an inputted speed command and an estimated speed closer to zero; and a model prediction control unit that applies, to a plurality of predicted currents including a current change ratio determined depending on each of a plurality of switching patterns based on a space voltage vector that are able to be outputted by the power supply unit, an evaluation function to evaluate a size of a difference from a predicted current corresponding to each of the torque component current command value and an excitation component current command value inputted from outside, and that selects and outputs a switching pattern.

Also, an air conditioner of another embodiment includes a compressor, a motor that drives the compressor, and the motor control device of the above embodiment.

First Embodiment

Figure 1:
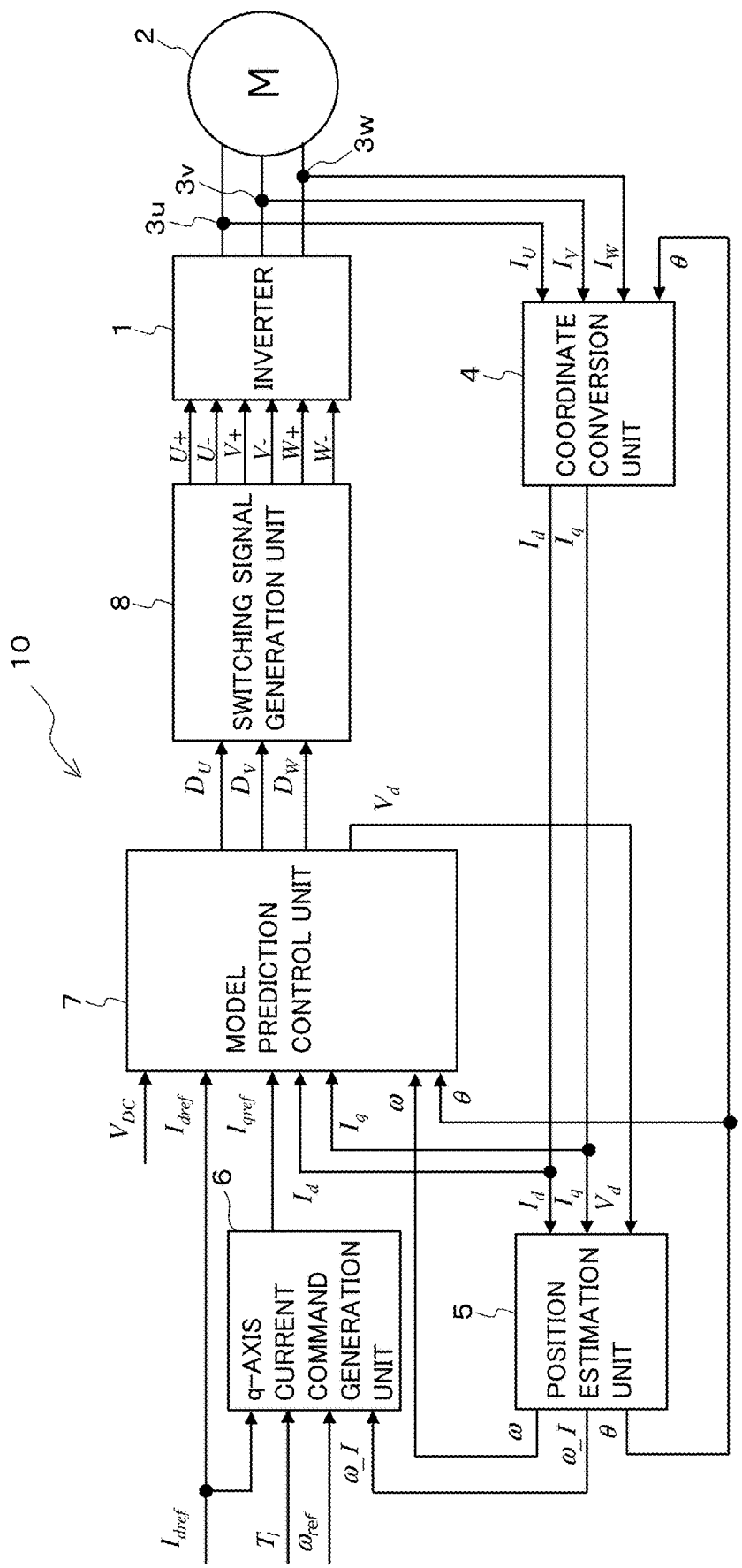
FIG. 1 is a functional block diagram showing a configuration of a motor control device according to a first embodiment.

FIG. 1 is a functional block diagram showing a configuration of a motor control device. An inverter circuit 1 that is a power supply unit uses, for example, six insulated gate bipolar transistors (IGBTs) as semiconductor switching elements although not shown, and these transistors are configured with three-phase bridge connection. Each phase output terminal of the inverter circuit 1 is connected, for example, to a terminal of each phase winding with star connection in a brushless DC motor 2 that is a permanent magnet synchronous motor.

For example, current detectors 3u, 3v and 3w are current transformers provided on output lines of the inverter circuit 1, and detect currents Iu, Iv and Iw of respective U, V, and W-phases. Note that the currents of two of the three phases may be detected, and the current of the remaining phase may be obtained by calculation. Current detection signals from the current detectors 3u, 3v, and 3w are inputted into a coordinate conversion unit 4 and are converted to digital data with an unshown A/D converter. The coordinate conversion unit 4 converts the three-phase currents Iu, Iv and Iw to two-phase currents Iα and Iβ, and converts the currents Iα and Iβ of a resting coordinate system to a d-axis current $I_d$ and a q-axis current $I_q$ of a rotating coordinate system based on a rotation phase angle θ estimated by a position estimation unit 5 that is a speed and electric angle estimation unit.

A q-axis current command generation unit 6 that is a torque current command determination unit performs calculation by use of a speed command $\omega_{ref}$, an integral value ω_I of a motor angular speed estimated by the position estimation unit 5, a load torque, a d-axis current command, a motor constant and a sampling cycle. Then, the unit generates a q-axis current command $I_{qref}$ so that a motor speed ω follows the speed command $\omega_{ref}$ and outputs the command to a model prediction control unit 7, which will be described later in detail. Also, an excitation current command $I_{dref}$ to be inputted to the model prediction control unit 7 is usually set to zero and set to a negative value when performing weak field control or the like.

The model prediction control unit 7 predicts the d-axis and q-axis currents $I_d$ and $I_q$, when eight switching patterns that can be outputted by the inverter circuit 1 are tried using a DC voltage $V_{DC}$, the motor speed ω, the rotation phase angle θ, the d-axis current $I_d$ and q-axis current $I_q$ converted by the coordinate conversion unit 4, the motor constant and the sampling cycle.

An evaluation function is, for example, an expression to determine whether the predicted d-axis current $I_d$ and the excitation current command $I_{dref}$, or the q-axis current $I_q$ and the q-axis current command $I_{qref}$ provided by the q-axis current command generation unit 6 are closest to each other. The model prediction control unit 7 selects an optimum switching pattern based on an evaluation result obtained by using the evaluation function, and outputs the pattern to the inverter circuit 1. A switching signal generation unit 8 converts three-phase duty command values Du, Dv and Dw based on the selected switching pattern to switching signals and transmits each signal to a gate of each IGBT included in the inverter circuit 1.

The above components excluding the inverter circuit 1 are realized by software processing executed by a microcomputer, to form a motor control device 10 that performs vector control and model prediction control. For example, the microcomputer, not specifically shown in the drawing, includes an input/output port, a serial communication circuit, an A/D converter to input an analog signal such as the current detection signal, a timer to perform PWM control, and others.

Figure 2:
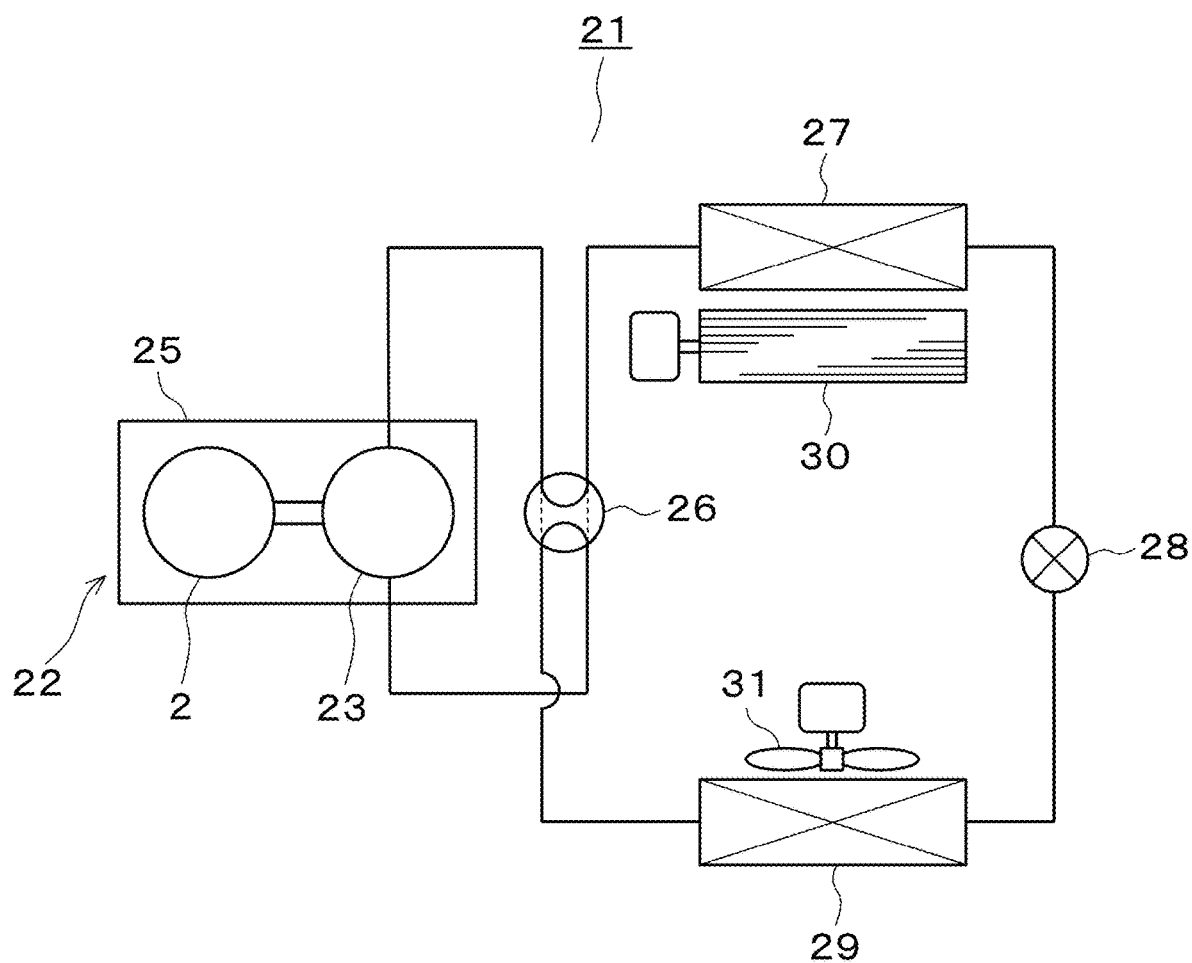
FIG. 2 is a diagram showing a configuration of an air conditioner to which the motor control device is applied.

FIG. 2 shows a configuration of an air conditioner to which the motor control device is applied. A compressor 22 included in an air conditioner 21 includes a configuration where a compression unit 23 and the motor 2 are contained in one iron closed container 25, and a rotor shaft of the motor 2 is coupled to the compression unit 23. Then, the compressor 22, a four-way valve 26, an indoor heat exchanger 27, a decompression device 28 and an outdoor heat exchanger 29 are connected to form a closed loop via a pipe that serves as a refrigerant passage. Note that the compressor 22 is, for example, a rotary 1-cylinder compressor.

During heating, the four-way valve 26 is in a state shown with a solid line, and a high-temperature refrigerant compressed in the compression unit 23 of the compressor 22 is supplied from the four-way valve 26 to the indoor heat exchanger 27 to condense, is then decompressed in the decompression device 28, flows at a lowered temperature through the outdoor heat exchanger 29, and evaporates in this heat exchanger to return to the compressor 22. On the other hand, during cooling, the four-way valve 26 is switched to a state shown with a dashed line. Consequently, the high-temperature refrigerant compressed in the compression unit 23 of the compressor 22 is supplied from the four-way valve 26 to the outdoor heat exchanger 29 to condense, is then decompressed in the decompression device 28, flows at a lowered temperature through the indoor heat exchanger 27, and evaporates in this exchanger to return to the compressor 22. Then, air is blown through the respective indoor and outdoor heat exchangers 27 and 29 with fans 30 and 31, and the air blown allows the respective heat exchangers to efficiently perform heat exchange between the heat exchanger 27 and indoor air and between the heat exchanger 29 and outdoor air.

Figure 3:
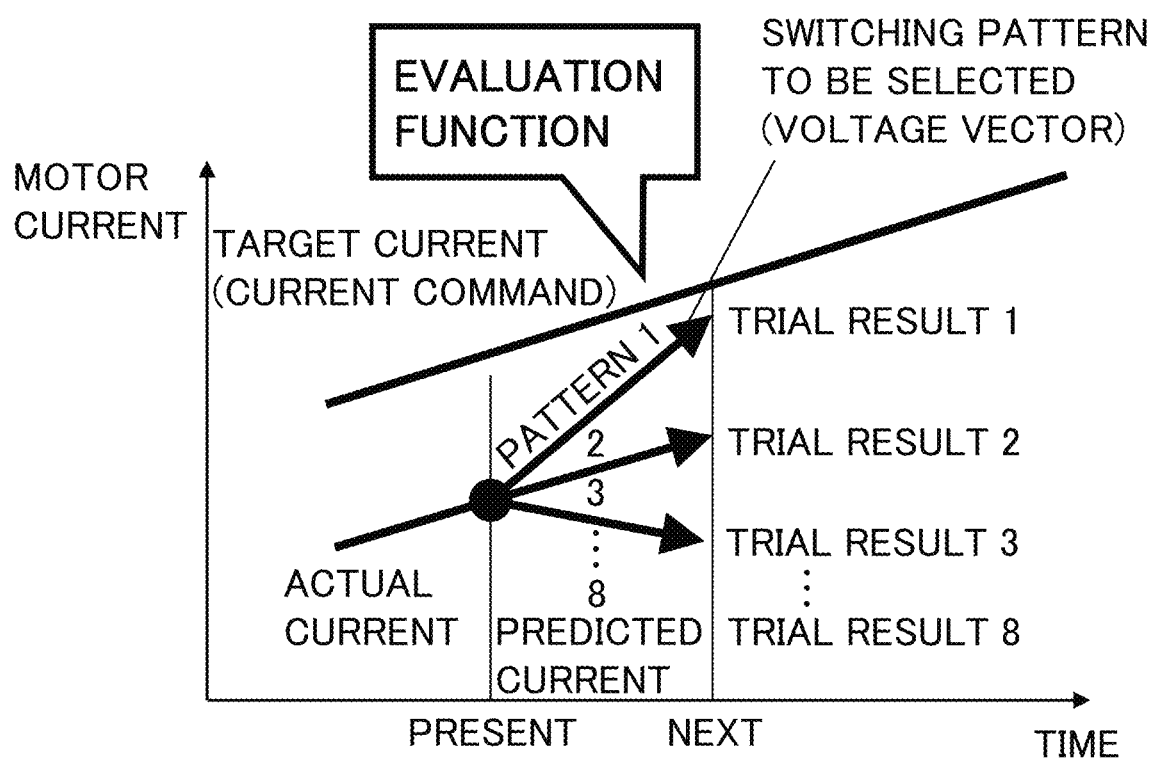
FIG. 3 is an image diagram showing evaluation of each switching pattern, in which an evaluation function is used.

Next, a principle of an operation of the present embodiment will be described with reference to FIGS. 3 to 8. As shown in FIG. 3, the model prediction control unit 7 calculates a predicted current in a first step and selects the switching pattern depending on the evaluation function in a second step. In the first step, a current when one control cycle passes after each switching pattern is tried is predicted using a current change ratio. First, d-axis and q-axis current change ratios $S_{d0}$ and $S_{q0}$ at a zero vector can be obtained with the following expression based on a voltage equation of the permanent magnet synchronous motor.

[Expression 1]

$$S_{d0} = -\frac{R}{L_d}I_d + \omega \frac{L_q}{L_d}I_q \qquad (1)$$

$$S_{q0} = -\frac{R}{L_q}I_q - \omega \frac{L_d}{L_q}I_d - \frac{\phi\omega}{L_q} \qquad (2)$$

wherein R is a winding resistance [Ω], $L_d$ is a d-axis inductance [H], $L_q$ is a q-axis inductance [H], $I_d$ is the d-axis current [A], $I_q$ is the q-axis current [A], $\phi$ is an interlinkage magnetic flux [Wb], and ω is an estimated speed [rad/sec].

Subsequently, d-axis and q-axis current change ratios $S_{d1}$ and $S_{q1}$ at an active vector can be obtained with the following expression by use of Expressions (1) and (2).

[Expression 2]

$$S_{d1} = S_{d0} + \frac{V_d}{L_d} \tag{3}$$

$$S_{q1} = S_{q0} + \frac{V_q}{L_q} \tag{4}$$

wherein $V_d$ is a d-axis voltage [V], and $V_q$ is a q-axis voltage [V].

Figure 4:
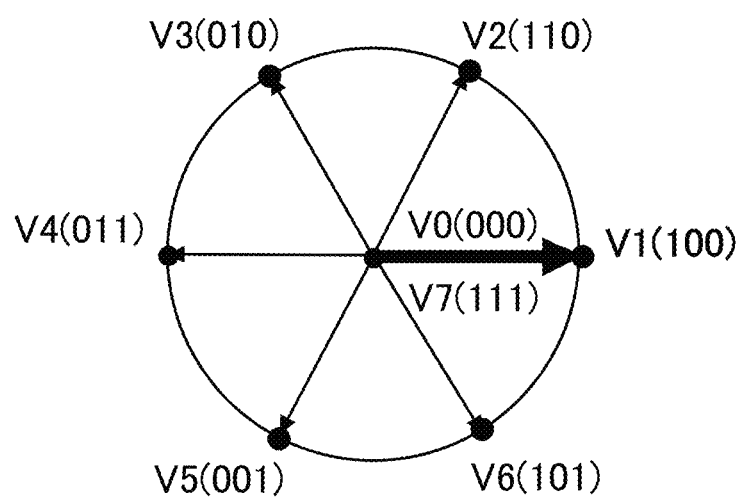
FIG. 4 is a diagram showing space voltage vectors.

FIG. 4 shows a switching pattern to be tried, and FIG. 5 shows a relation between the switching pattern and motor three-phase voltages. Eight switching patterns V0 to V7 are tried in order, and the motor three-phase voltages corresponding to each switching pattern are generated. Then, coordinate conversion of the motor three-phase voltages is performed using the rotation phase angle θ, to obtain the d-axis voltage $V_d$ and q-axis voltage $V_q$ to be commanded with the following expression. A case of relative conversion is provided. The d-axis voltage $V_d$ is for use in position estimating calculation.

[Expression 3]

$$V_d = \frac{2}{3}\left(V_u * \cos\theta + V_v * \cos\left(\theta - \frac{2}{3}\pi\right) + V_w * \cos\left(\theta + \frac{2}{3}\pi\right)\right) \tag{5}$$

$$V_q = -\frac{2}{3}\left(V_u * \sin\theta + V_v * \sin\left(\theta - \frac{2}{3}\pi\right) + V_w * \sin\left(\theta + \frac{2}{3}\pi\right)\right) \tag{6}$$

Figure 6:
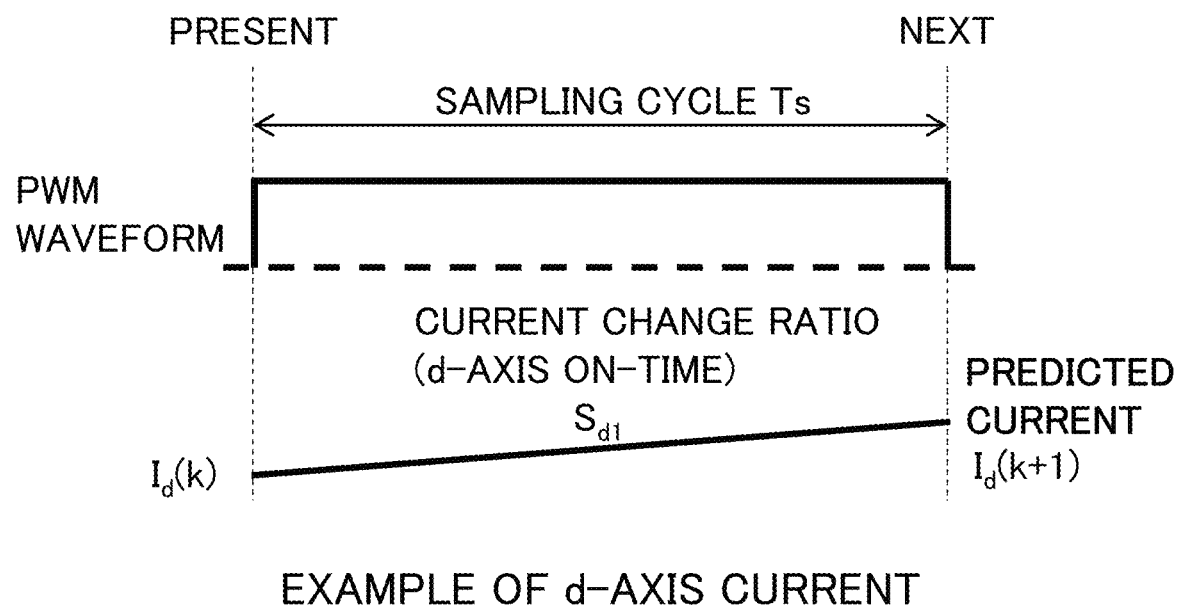
FIG. 6 is a diagram showing a relation between a presently obtained current Id(k) and a predicted current Id(k+1) along a d-axis.

The d-axis voltage $V_d$ and the q-axis voltage $V_q$ change with the switching pattern to be tried, and hence $S_{d1}$ and $S_{q1}$ obtained with Expressions (3) and (4) also change, to obtain eight calculation results. As shown in FIG. 6, in a case where the switching pattern to be tried is fully on in the sampling cycle, a next predicted current $I_d(k+1)$ after one control cycle is obtained with the following expression by use of a present current $I_d(k)$ and Expressions (3) and (4). In this case, a predicted cycle of the current is equal to a sampling cycle $T_s$ [sec]. Similar to $S_{d1}$ and $S_{q1}$, there are next predicted currents $I_d(k+1)$ as many as energization patterns to be tried, that is, eight currents. Note that a trial result of V0 is equal to that of V7, and one of the results is selected depending on the evaluation function. Description will be made later as to this respect.

$$I_d(k+1) = I_d(k) + T_s S_{d1} \tag{7}$$

$$I_q(k+1) = I_q(k) + T_s S_{q1} \tag{8}$$

Next, the selection of the switching pattern in the second step will be described. Following expressions are solved as to an evaluation function g by use of the next predicted currents $I_d(k+1)$ and $I_q(k+1)$ in each switching pattern that are calculated with Expressions (7) and (8).

$$g = a g_q + b g_d \tag{9},$$

$$g_q = [\{I_{qref} - I_q(k+1)\}]^2 \tag{10}, \text{and}$$

$$g_d = [\{I_{dref} - I_d(k+1)\}]^2 \tag{11},$$

wherein a and b are weight factors, $g_q$ is an evaluation expression of the q-axis current, and $g_d$ is an evaluation expression of the d-axis current.

Each of $g_q$ in Expression (10) and $g_d$ in Expression (11) is a square of a difference between the command value and the next predicted current, and these values are multiplied by the weight factors a and b, respectively, and added to obtain the evaluation function g in Expression (9). When the evaluation function g is minimum, the next predicted current is closest to the current command, and hence optimum one can be selected from eight switching patterns. Presently, the evaluation function g in Expression (9) is shown by way of example, and the evaluation function may be changed depending on drive conditions required for the inverter circuit 1. For example, to reduce switching loss in the inverter circuit 1, transition conditions of the switching pattern may be added to the evaluation function. Specifically, transition of the switching pattern may be limited so that the total number of state changes in the three-phase semiconductor switching elements is 1 or less. An example where active vectors V1 to V6 transition to zero vectors V0 and V7 will be described. The vectors V1, V3 and V5 transition to the vector V0, and the vectors V2, V4 and V6 transition to the vector V7. As a final output voltage of the inverter circuit 1, the selected switching pattern is outputted as a signal with a duty ratio of 100%.

Note that in an actual machine, the switching signal determined in the model prediction control is updated and outputted after one control cycle. Then, a current flowing in response to the switching signal is detected after two control cycles. Therefore, in the actual machine, the model prediction control includes trying the energization pattern after one control cycle to predict a current after two control cycles and selecting the switching pattern in which the predicted current is closest to the present current command.

Next, description will be made as to the q-axis current command generation unit 6. In FIG. 1, the q-axis current command $I_{qref}$ and the d-axis current command $I_{dref}$ are inputted into the model prediction control unit 7. The q-axis current command $I_{qref}$ is calculated in the q-axis current command generation unit 6, and the d-axis current command $I_{dref}$ is set to zero in the present embodiment. In the q-axis current command generation unit 6, to reduce vibration of the compressor 22, the q-axis current change command $I_{qref}$ to generate a torque with a difference between the speed command $\omega_{ref}$ and the estimated speed ω being zero is calculated. An arithmetic expression of the q-axis current command $I_{qref}$ is obtained from an arithmetic expression of the estimated speed and the estimated torque in the model prediction control, and a predicted speed ω(k+1) is represented by the following expression from a mechanical motion equation.

[Expression 4]

$$\omega(k+1) = \frac{J - T_s D}{J}\omega(k) + \frac{T_s}{J}p(T_e(k+1) - T_l(k)) \tag{12}$$

wherein J is an inertia moment [kg·m²], D is a viscous friction coefficient [Nm/(rad/sec)], p is a number of pole pairs, $T_e$ is an output torque [Nm], $T_s$ is a load torque [Nm], and ω is an angular speed [rad/sec].

When Expression (12) is solved as to a next output torque $T_e(k+1)$, the following expression is obtained.

[Expression 5]

$$T_e(k+1) = \frac{\omega(k+1) - \omega(k) + \frac{T_s D}{J}\omega(k)}{\frac{T_s}{J}p} + T_l(k) \quad (13)$$

Note that in a case of position-sensorless control, for a present speed ω(k) in Expressions (12) and (13), not the estimated speed ω but the integral value ω_I of the estimated speed is used. This is an estimated speed (integral) ω_I. In the model prediction control, the d-axis voltage $V_d$ and the q-axis voltage $V_q$ noticeably change every sampling cycle, and as a result, a d-axis induced voltage $E_d$ including position error information similarly noticeably changes. Therefore, the estimated speed ω includes a large fluctuation component for each control cycle. Therefore, the estimated speed (integral) ω_I is used so that the q-axis current command $I_{qref}$ does not include the fluctuation component for each sampling cycle. In Expression (13), the next output torque $T_e(k+1)$ is determined to bring the predicted speed ω(k+1) closer to the speed command $\omega_{ref}$, and hence Expression (13) can be replaced as in the following expression.

[Expression 6]

$$T_e(k+1) = \frac{\omega_{ref} - w\_I + \frac{T_s D}{J} w\_I}{\frac{T_s}{J}p} + T_l(k) \quad (14)$$

The next output torque indicated in Expression (14) is a total value of the torque and the load torque in which the difference between the speed command and the estimated speed (integral) is zero. Subsequently, the predicted torque that is the next output torque is represented by the following expression from a torque expression of a vector control coordinate of the permanent magnet synchronous motor.

$$T_e(k+1) = p\{\phi I_q(k+1) + (L_d - L_q)I_d(k+1)I_q(k+1)\} \quad (15)$$

When Expression (15) is solved as to $I_q(k+1)$, the following expression is obtained.

[Expression 7]

$$I_q(k+1) = \frac{T_e(k+1)}{p(\phi + (L_d - L_q)I_d(k+1))} \quad (16)$$

When substituting Expression (14) into Expression (16) to bring the respective predicted currents $I_q(k+1)$ and $I_d(k+1)$ closer to the current commands $I_{qref}$ and $I_{dref}$, Expression (16) is replaced as in the following expression, and the q-axis current command $I_{qref}$ to reduce the vibration of the compressor 22 can be calculated.

[Expression 8]

$$I_{qref} = \frac{1}{p(\phi + (L_d - L_q)I_{dref})}\left(\frac{\omega_{ref} - w\_I + \frac{T_s D}{J}w\_I}{\frac{T_s}{J}p} + T_l(k)\right) \quad (17)$$

With Expression (17), the q-axis current command $I_{qref}$ is calculated based on the torque with the difference between the speed command and the estimated speed (integral) being zero, and the load torque. For the former torque, the above speed difference is multiplied by a gain, so that a control amount can be adjusted. As the latter load torque $T_l$, for example, a result estimated by such a conventional technology as in Patent Literature 1 is used.

Figure 7:
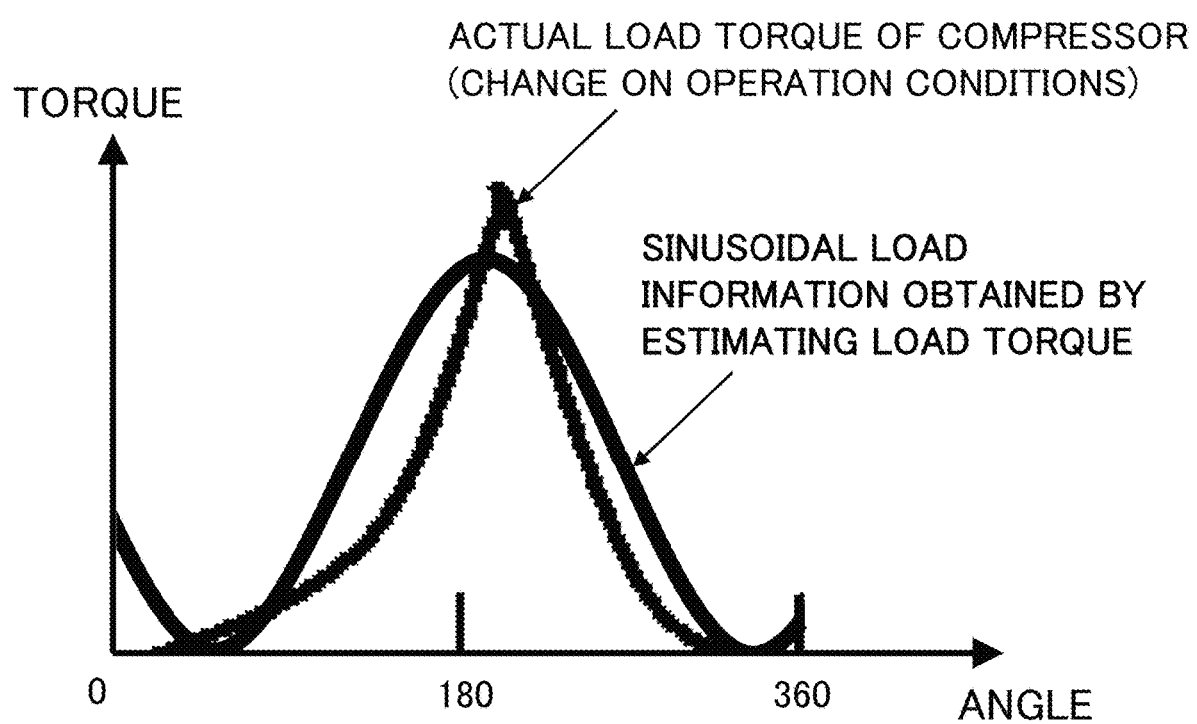
FIG. 7 is a graph showing an actual load torque waveform of a compressor, and a sinusoidal load torque waveform obtained by estimation.

As shown in FIG. 7, when sinusoidally approximated load-torque basic wave information is obtained, for example, by estimating the load torque using the conventional technology for an actual load torque of the compressor that changes on operation conditions of the air conditioner, and the information is used in model prediction control, model error is caused, to eventually cause speed error. In Expression (14), a first term on a right side, which is not seen in the conventional technology, is added to compensate the error. Therefore, the q-axis current command $I_{qref}$ is determined by Expression (17), so that the estimated speed ω can follow the speed command $\omega_{ref}$.

Figure 8:
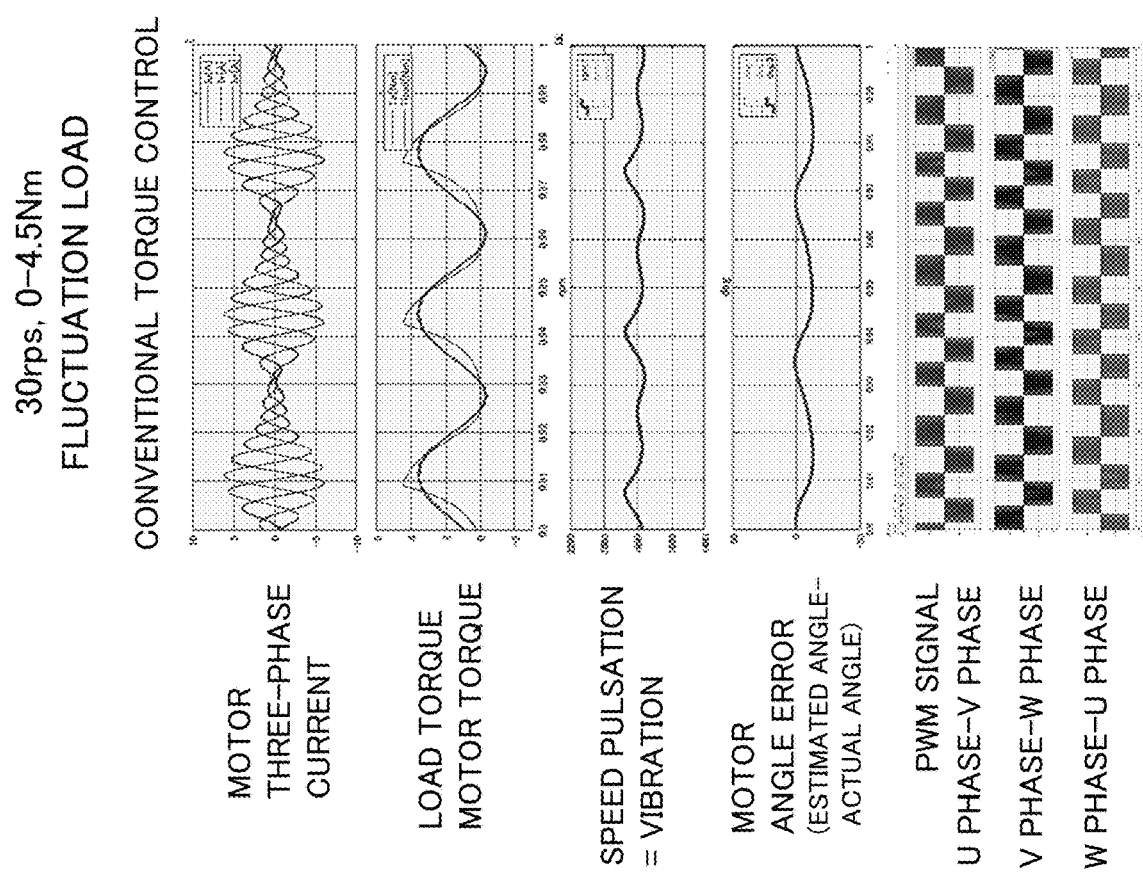
FIG. 8 is a diagram showing a waveform of each signal as to conventional torque control and torque control of the present embodiment.

FIG. 8 shows a simulation result when the motor is driven at 30 rps, a fluctuation load, and a sampling frequency of 5 kHz equal to a control frequency. In conventional vector control and torque control, PI control is used, and a final inverter output voltage is determined after actual estimated speed and current gradually follow command values. Therefore, responsiveness is low. Also, a PWM signal is generated by a carrier comparison method, and hence the control frequency is equal to a switching frequency.

On the other hand, in the model prediction control of the present embodiment, the command value is directly determined using electrical and mechanical models as described above, and hence high responsiveness can be acquired. While the control frequency remains at 5 kHz, the signal with the duty ratio of 100% selected as a result of prediction is switched at a timing at which switching is required. For example, with present drive conditions, an average switching frequency is reduced to about 1 kHz, and this indicates that efficiency can be improved by reducing switching loss of a power device.

As described above, according to the present embodiment, the inverter circuit 1 supplies AC power as the load to the motor 2 that drives the compressor 22 of the air conditioner 21, and a current detection unit 3 detects the currents Iu, Iv and Iw flowing through the winding of the motor 2. The position estimation unit 5 estimates the rotation speed ω and the electric angle θ of the motor 2 based on the voltage outputted by the inverter circuit 1 and the current, and the coordinate conversion unit 4 obtains the excitation current $I_d$ and the torque current $I_q$ based on the currents Iu to Iw and the electric angle θ.

The q-axis current command generation unit 6 substitutes the predicted torque $T_e(k+1)$ calculated based on the mechanical motion equation into the torque component current command value calculated based on the torque expression of the vector control coordinate of the motor 2, to generate a torque component current command value $I_{qref}$ for bringing the difference between the inputted speed command $\omega_{ref}$ and the estimated speed ω closer to zero. The model prediction control unit 7 applies, to a plurality of predicted currents including a current change ratio determined depending on each of a plurality of switching patterns based on a space voltage vector that are able to be outputted by the inverter circuit 1, an evaluation function to evaluate a size of a difference from a predicted current corresponding to each of the torque component current command value $I_{qref}$ and the excitation component current command value $I_{dref}$ that is inputted from outside, and selects and outputs a switching pattern.

Specifically, the model prediction control unit 7 selects one switching pattern from eight switching patterns obtained by adding two zero vectors to six space voltage vectors set every 60 degrees of electric angle, and outputs the selected switching pattern with a duty ratio of 100% to a switching cycle.

Consequently, when the motor 2 is controlled by the position-sensorless method in the air conditioner 21 in which it is assumed that comparatively large load fluctuation occurs as in the compressor 22, the speed ω of the motor 2 can follow the target speed $\omega_{ref}$ at a high speed. Then, the selected switching pattern is outputted with the duty ratio of 100% to the switching cycle, so that switching loss can be reduced, and product performance of the air conditioner 21 can be improved as a whole.

Also, the q-axis current command generation unit 6 uses, as a parameter to generate the torque component current command value $I_{qref}$, an integral value ω_I of an estimated speed that is obtained in a process of obtaining an estimated value ω of a rotation speed in the position estimation unit 5, so that it can be avoided to include fluctuation of a current for each sampling cycle in the command value $I_{qref}$.

Furthermore, the model prediction control unit 7 uses, as the evaluation function g, a function obtained by adding the squared value of the difference between the torque component current command value $I_{qref}$ and the corresponding predicted current $I_q(k+1)$, and the squared value of the difference between the excitation component current command value $I_{dref}$ and the corresponding predicted current $I_d(k+1)$ and can therefore adequately evaluate each switching pattern.

Second Embodiment

Hereinafter, the same part as in the first embodiment is denoted with the same reference sign, and is not described, and description will be made as to a different part. In the control of the first embodiment, the number of switching times is reduced by selecting one voltage vector that is the switching pattern, and current ripple of the motor 2 increases. Therefore, in a second embodiment, control is additionally performed to reduce the current ripple. Specifically, a third step of calculating an occurrence time of each vector with use of two voltage vectors is added to the first and second steps in the model prediction control of the first embodiment.

When the voltage vector selected as in the first embodiment is a main vector, one of voltage vectors adjacent to the main vector is selected as a sub vector, and the occurrence time of each vector is adjusted, to output a finally synthesized voltage vector by space vector modulation. Consequently, also in a carrier comparison method, an inverter circuit 1 can output any voltage vector.

Figure 9:
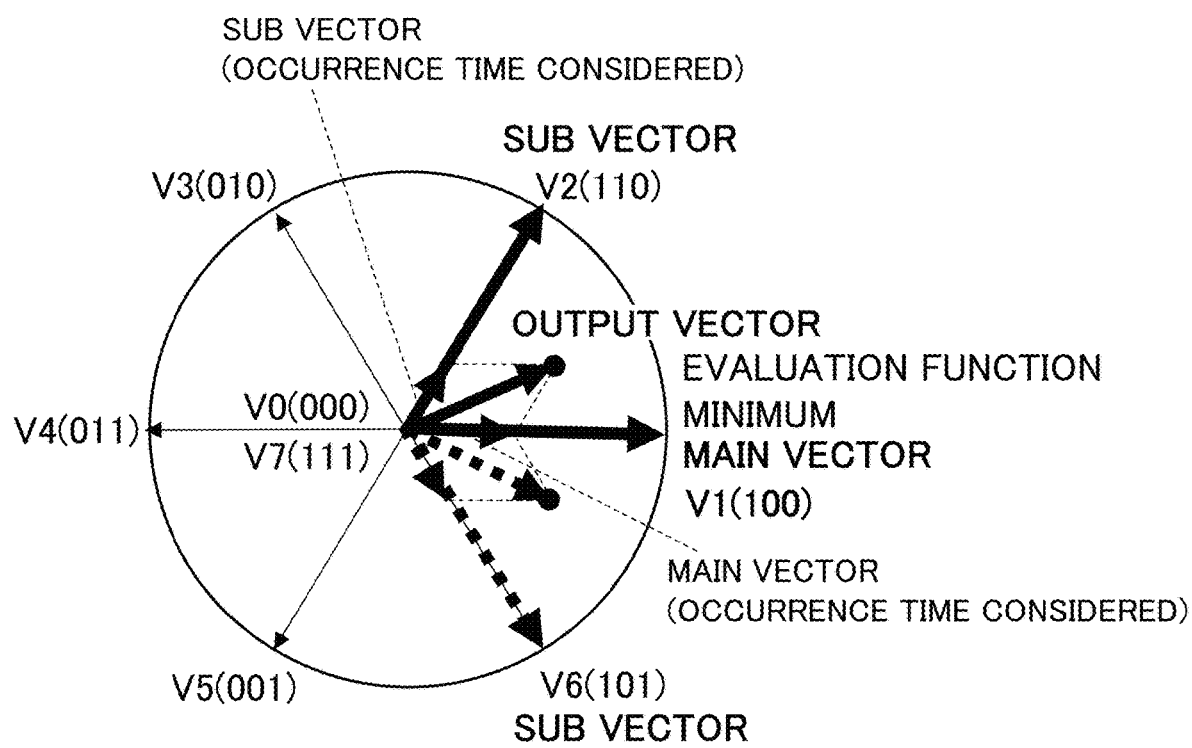
FIG. 9 is a diagram showing an example of selection of a main vector and a sub vector in a space voltage vector according to a second embodiment.

FIG. 9 shows voltage vectors outputted in the second embodiment. In the first embodiment, the current in the case where the main vector is only fully on, that is, outputted with the duty ratio of 100% is predicted, and one is selected from eight voltage vectors including the zero vector as to the switching pattern with the minimum evaluation function g. In the second embodiment, the switching pattern may be selected from six patterns (V1 to V6) excluding the zero vector. At this time, the selected switching pattern is the main vector, and hence corresponding current change ratios $S_{d1}$ and $S_{q1}$ may be $S_{d1\_main}$ and $S_{q1\_main}$.

In FIG. 9, for example, when the main vector with the minimum evaluation function g is V1, the sub vector may be V2 or V6. When predicting the current, the current change ratios of all the switching patterns are calculated, and hence $S_{d1}$ and $S_{q1}$ corresponding to the sub vector may be $S_{d1\_sub}$ and $S_{q1\_sub}$.

An occurrence time of the main vector and an occurrence time of the sub vector may be calculated by defining an arithmetic expression of a predicted current with the occurrence time considered and solving simultaneous equations for the expression. It can be determined which sub vector V2 or V6 is to select, by obtaining the occurrence time of the main vector and the occurrence time of the sub vector. If a wrong sub vector is selected and the occurrence time is calculated, the occurrence time of the sub vector indicates a negative value. In this case, another sub vector is reselected, and the occurrence time is calculated again.

Figure 10:
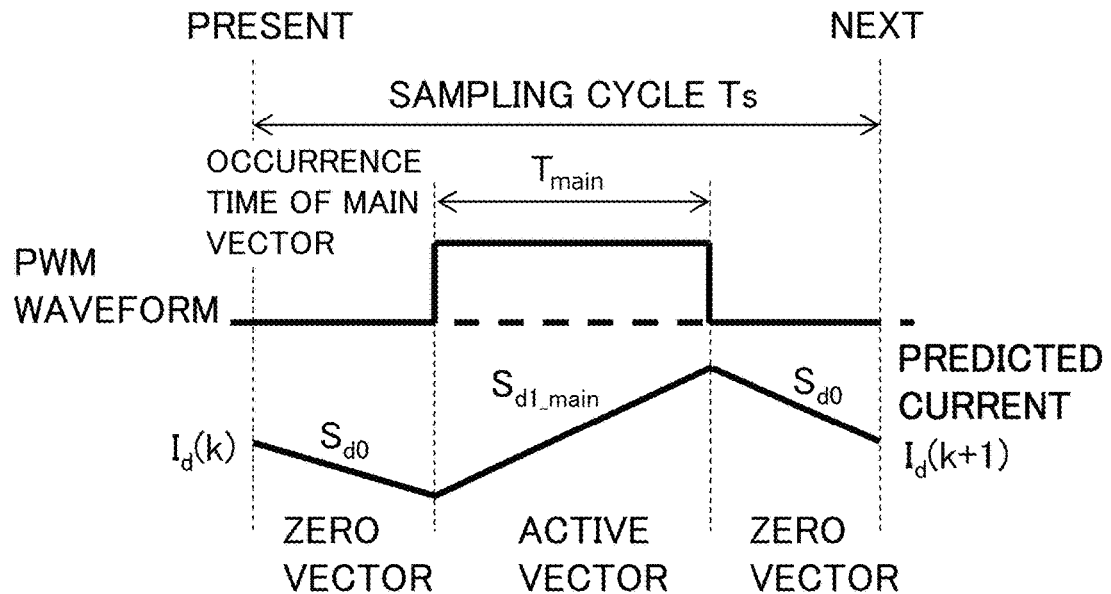
FIG. 10 is a diagram showing a relation between a presently obtained current Id(k) and a predicted current Id(k+1) along a d-axis.

Next, an arithmetic expression of the occurrence time is derived. First, as shown in FIG. 10, an arithmetic expression of the next predicted current in a case where the occurrence time of the main vector is considered is obtained by following expressions. The next current is predicted based on the occurrence time and current change ratio of each of an active vector and a zero vector.

$$I_d(k+1) = I_d(k) + (T_s - T_{main})S_{d0} + T_{main}S_{d1\_main} \quad (18)$$

$$= I_d(k) + T_s S_{d0} + T_{main}(S_{d1\_main} - S_{d0})$$

$$I_q(k+1) = I_q(k) + (T_s - T_{main})S_{q0} + T_{main}S_{q1\_main} \quad (19)$$

$$= I_q(k) + T_s S_{q0} + T_{main}(S_{q1\_main} - S_{q0})$$

Note that $T_{main}$ is the occurrence time [sec] of the main vector.

When the occurrence time and current change ratio of the sub vector are added to Expressions (18) and (19), following expressions are obtained.

$$I_d(k+1) = I_d(k) + T_s S_{d0} + T_{main}(S_{d1\_main} - S_{d0}) + T_{sub}(S_{d1\_sub} - S_{d0}) \quad (20)$$

$$I_q(k+1) = I_q(k) + T_s S_{q0} + T_{main}(S_{q1\_main} - S_{q0}) + T_{sub}(S_{q1\_sub} - S_{q0}) \quad (21)$$

Note that $T_{sub}$ is the occurrence time [sec] of the sub vector.

When deleting $T_{sub}$ from Expressions (20) and (21) and solving the expressions as to $T_{main}$, the following expression is obtained.

[Expression 9]

$$T_{main} = \frac{(S_{q0} - S_{q1\_sub})(I_d(k) - I_d(k+1) + T_s S_{d0}) - (S_{d0} - S_{d1\_sub})(I_q(k) - I_q(k+1) + T_s S_{q0})}{(S_{q1\_main} - S_{q0})(S_{d0} - S_{d1\_sub}) - (S_{d1\_main} - S_{d0})(S_{q0} - S_{q1\_sub})} \quad (22)$$

In Expression (22), the occurrence time of the main vector is determined to bring next d-axis and q-axis predicted currents $I_d(k+1)$ and $I_q(k+1)$ closer to a d-axis current command $I_{dref}$ and a q-axis current command $I_{qref}$, so that Expression (22) can be replaced as in the following expression.

[Expression 10]

$$T_{main} = \frac{(S_{q0} - S_{q1\_sub})(I_d(k) - I_{dref} + T_s S_{d0}) - (S_{d0} - S_{d1\_sub})(I_q(k) - I_{qref} + T_s S_{q0})}{(S_{q1\_main} - S_{q0})(S_{d0} - S_{d1\_sub}) - (S_{d1\_main} - S_{d0})(S_{q0} - S_{q1\_sub})} \quad (23)$$

The current change ratio obtained in the first step is substituted into Expression (23), so that the occurrence time of the main vector can be obtained.

Similarly, the occurrence time of the sub vector is obtained. When solving Expression (21) as to $T_{sub}$, the following expression is obtained.

[Expression 11]

$$T_{sub} = \frac{I_q(k) - I_q(k+1) + T_s S_{q0} + T_{main}(S_{q1\_main} - S_{q0})}{(S_{q0} - S_{q1\_sub})} \quad (24)$$

In Expression (24), the occurrence time of the sub vector is determined to bring the q-axis next predicted current $I_q(k+1)$ closer to the q-axis current command $I_{qref}$, so that Expression (24) can be replaced as in the following expression.

[Expression 12]

$$T_{sub} = \frac{I_q(k) - I_{qref} + T_s S_{q0} + T_{main}(S_{q1\_main} - S_{q0})}{(S_{q0} - S_{q1\_sub})} \quad (25)$$

When substituting $T_{main}$ obtained in Expression (23) into Expression (25), the occurrence time of the sub vector can be obtained. As above, when the occurrence time of the main vector and the occurrence time of the sub vector can be determined and each time is divided by a control cycle, duty ratios of the main vector and the sub vector are obtained. Then, limit processing of each duty ratio is performed as follows. In a case where the obtained duty ratios of the main vector and the sub vector are negative, the ratios are set to 0%. A total value of the duty ratios of the main vector and the sub vector is 100% at maximum. In a case where the total value is 100% or more, each of the duty ratios of the main vector and the sub vector is divided by the total value to correct the value. In a case where the above limit processing is performed, the duty ratio is changed. Therefore, the changed duty ratio is multiplied by the control cycle, and $T_{main}$ and $T_{sub}$ are recalculated. When the duty ratios of the main and sub vectors are divided to three-phase duty ratios based on FIG. 9, a PWM waveform after one control cycle that is closest to a present current command can be generated.

Afterward, model prediction control is repeated every control cycle. In other words, the present PWM signal waveform is a result of the previous model prediction control. When the next predicted current after one control cycle is obtained in the above-described first step, in the second embodiment, the current is obtained with Expressions (20) and (21) that are different from Expressions (7) and (8) of the first embodiment in that previous values of the current change ratio and vector occurrence time are required.

Also, in the second embodiment, a d-axis voltage $V_d$ for position estimation calculation needs to be recalculated with the following expression, because a finally outputted value is different from that at time of trial of the switching pattern. Note that this applies to a case of relative conversion.

[Expression 13]

$$V_d = \frac{2}{3}\left(D_u * \cos\theta + D_v * \cos\left(\theta - \frac{2}{3}\pi\right) + D_w * \cos\left(\theta + \frac{2}{3}\pi\right)\right) * V_{dc} \quad (26)$$

Figure 11:
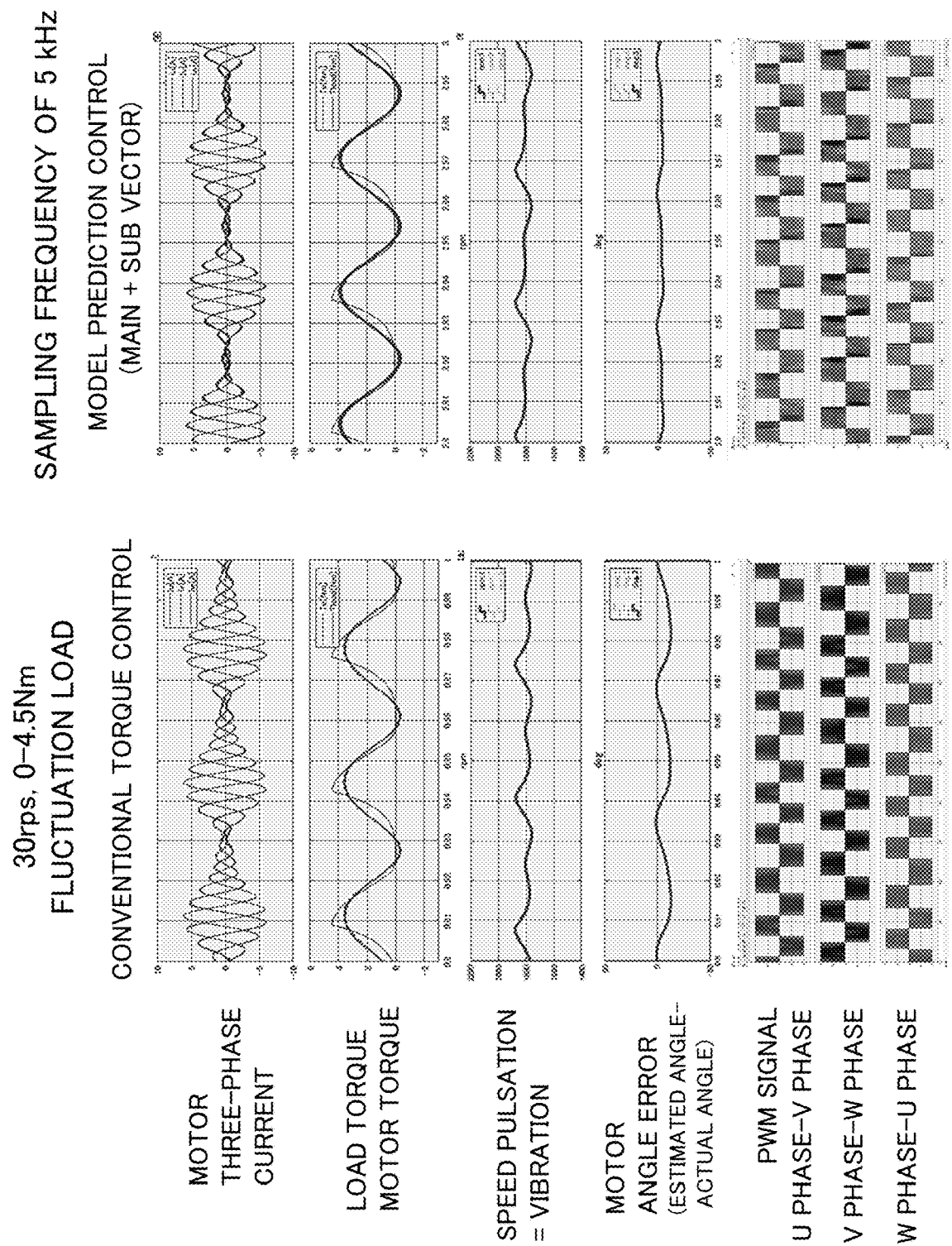
FIG. 11 is a diagram showing a waveform of each signal as to conventional torque control and torque control of the present embodiment.

FIG. 11 shows simulation results. The occurrence time of one of the sub vectors adjacent to the main vector determined by the evaluation function can be determined so that the predicted current is close to the current command value, and the inverter can output any voltage vector. Therefore, the optimum switching pattern can be selected, and current ripple can be reduced.

Figure 12:
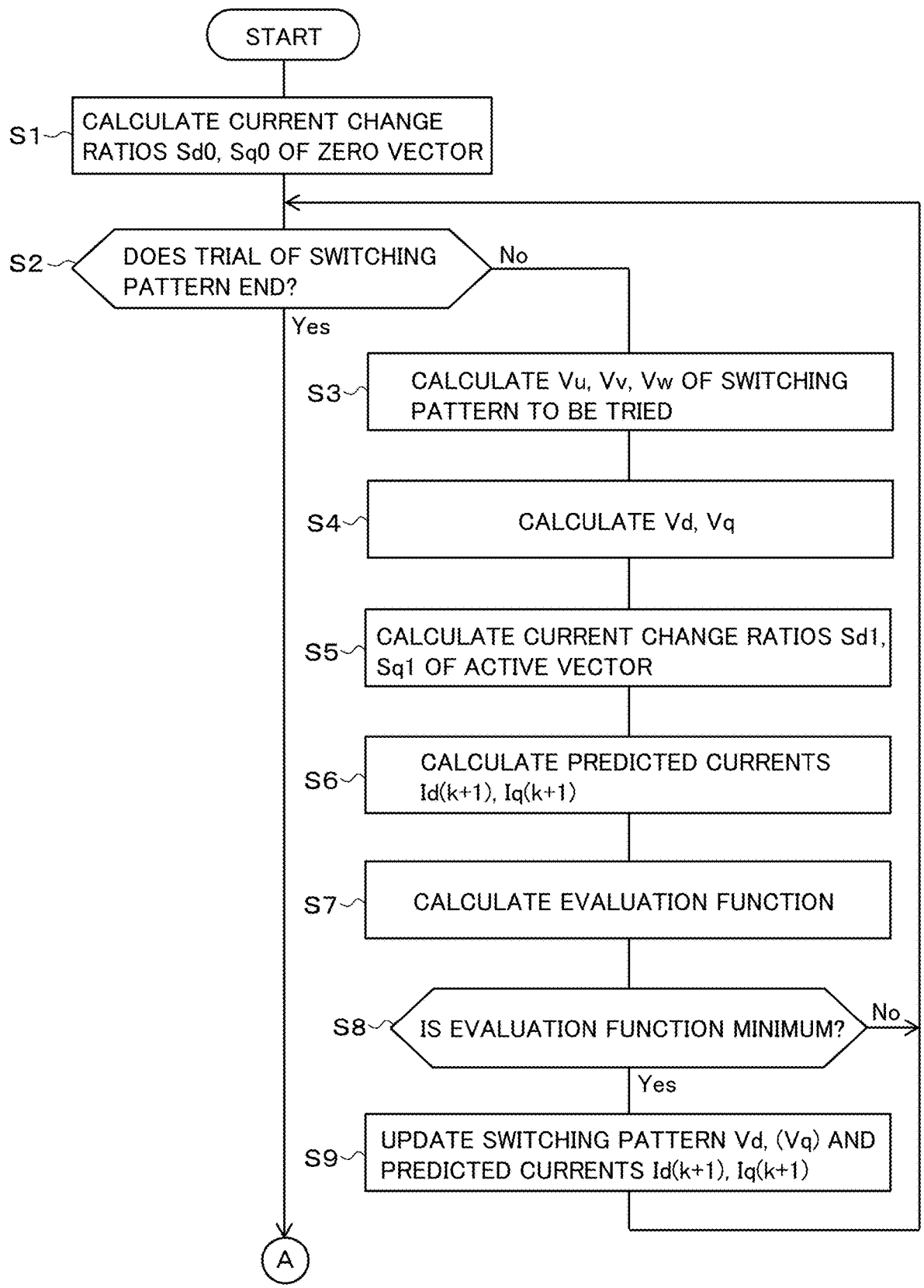
FIG. 12 is a flowchart (No. 1) showing control content.
Figure 13:
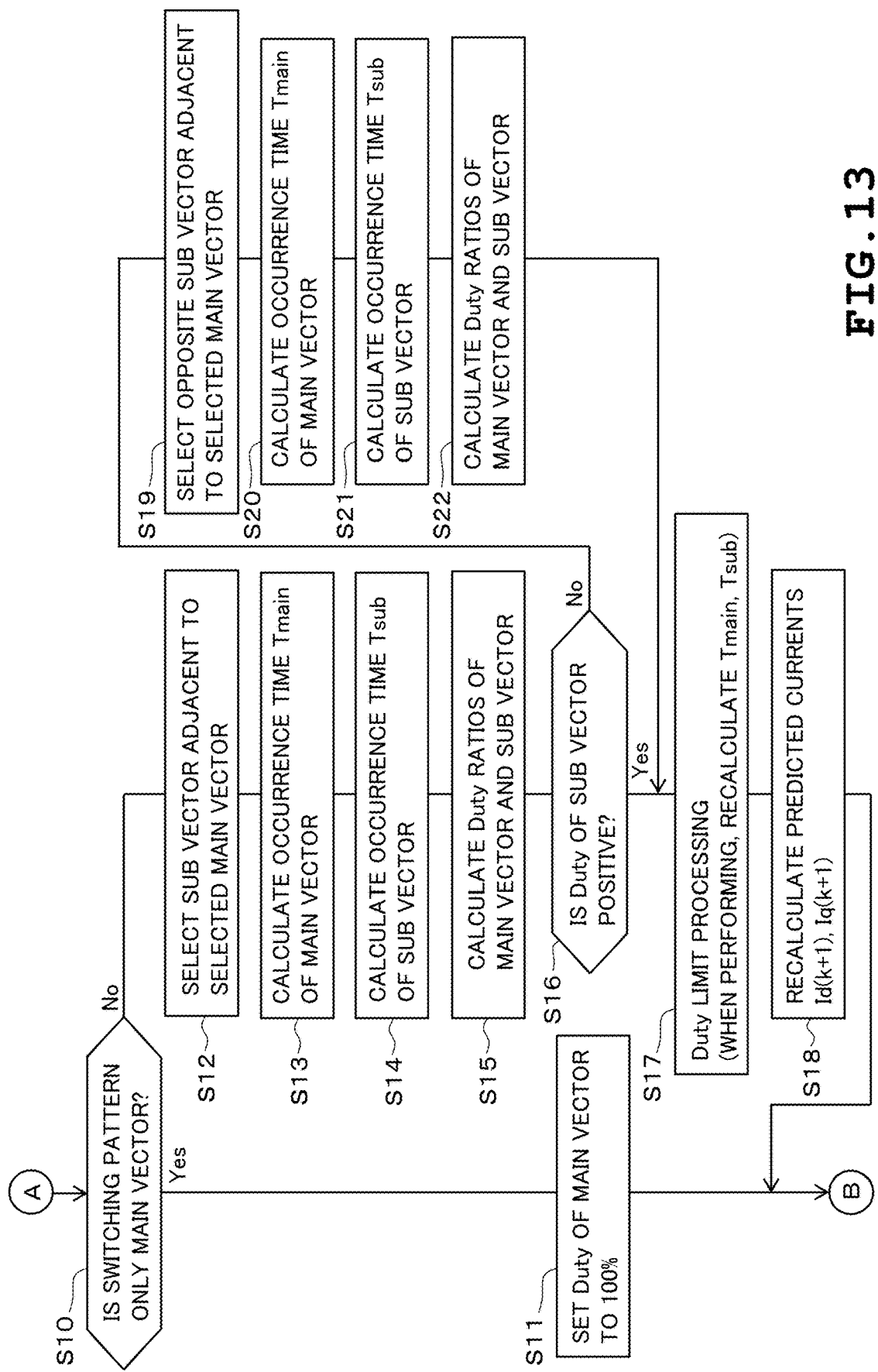
FIG. 13 is a flowchart (No. 2) showing control content.
Figure 14:
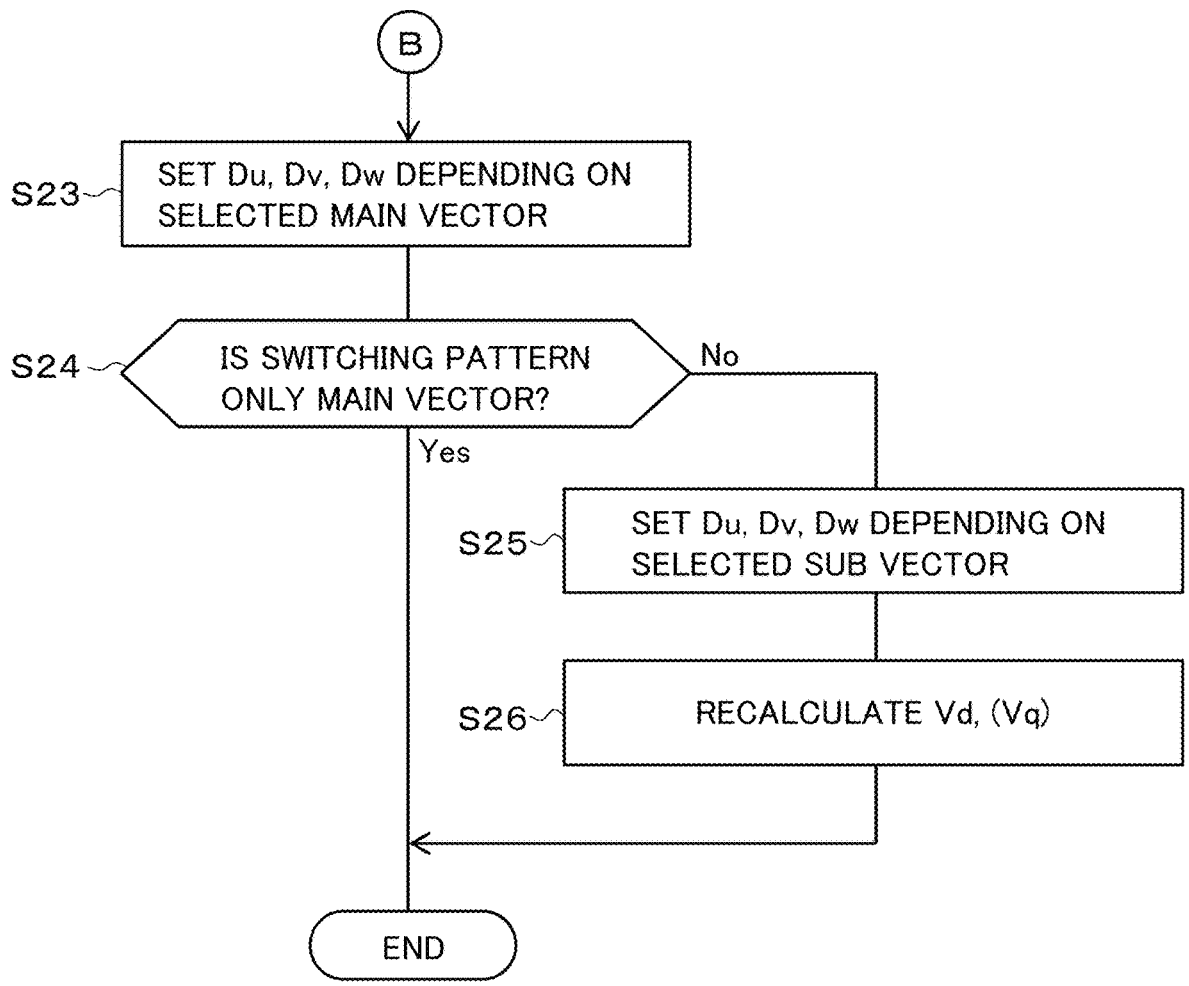
FIG. 14 is a flowchart (No. 3) showing control content.
Figure 15:
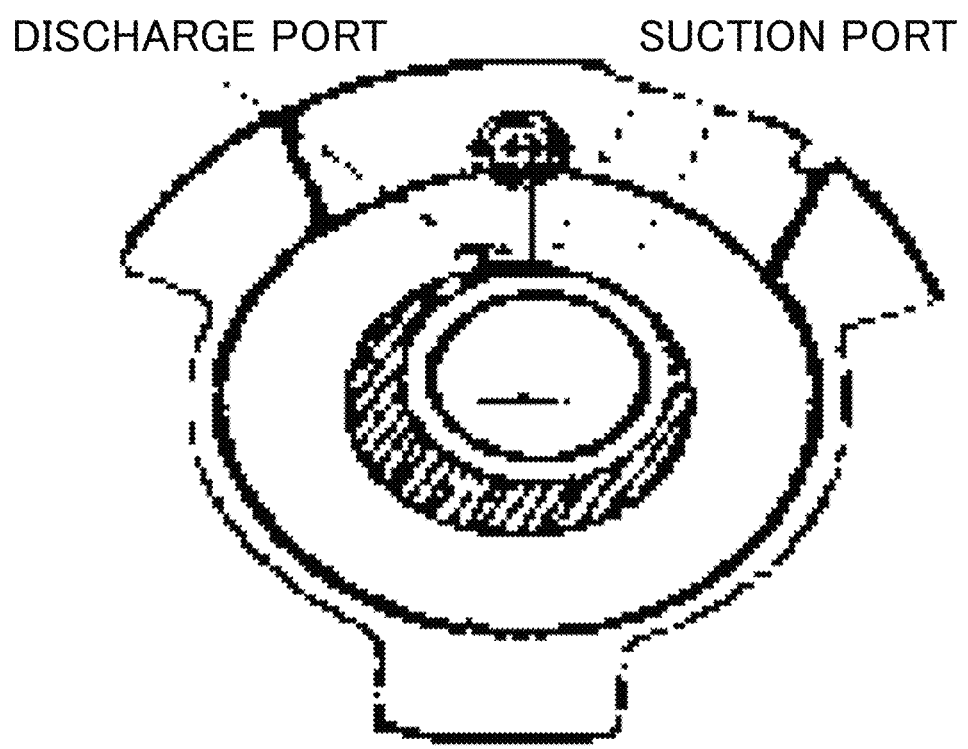
FIG. 15 is a view showing a cross-sectional structure of a 1-cylinder rotary compressor.
Figure 16:
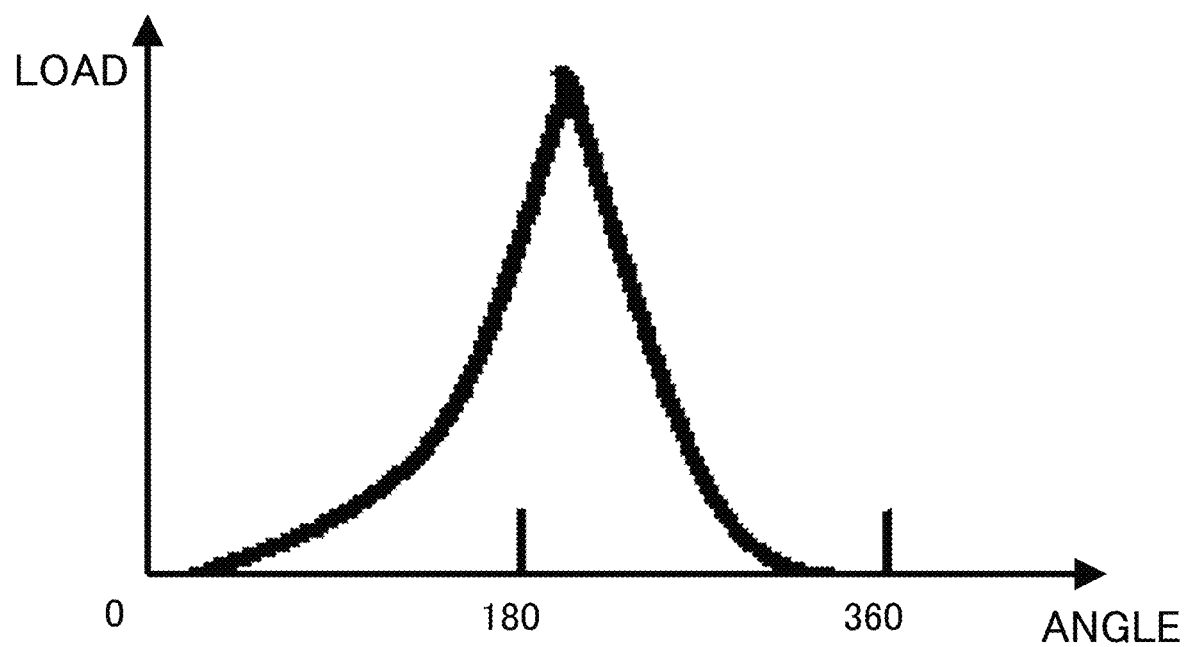
FIG. 16 is a graph showing load fluctuation that occurs depending on a rotation machine angle of a compressor motor.

FIGS. 12 to 14 are flowcharts in which it is assumed to selectively execute the control of the first embodiment and the control of the second embodiment. First, when the current change ratios $S_{d0}$ and $S_{q0}$ of the zero vector are calculated with Expressions (1) and (2) (S1), trial and evaluation of each switching pattern are performed in repetition processing of steps S3 to S9. Output voltages Vu, Vv and Vw by the tried switching pattern are calculated (S3), and an excitation voltage Vd and a torque voltage Vq are calculated from the voltages (S4).

Next, current change ratios $S_{d1}$ and $S_{q1}$ are calculated for one of active vectors V1 to V6 with Expressions (3) and (4) (S5), predicted currents $I_d(k+1)$ and $I_q(k+1)$ are calculated with Expressions (7) and (8) (S6). Note that when calculating duty ratios Du, Dv, and Dw of respective phases to perform the control of the second embodiment, the current change ratios $S_{d1}$ and $S_{q1}$ are stored. Then, an evaluation function g is calculated with Expression (9) (S7), and calculation results are compared to select a minimum value of the evaluation function g (S8). If the present calculation result is tentatively minimum (YES), a corresponding switching pattern, $V_d$ and $V_q$ and predicted currents $I_d(k+1)$ and $I_q(k+1)$ are updated (S9).

When all the switching patterns are tried (YES in S2), in a case of performing the control of the first embodiment (YES in S10), the duty ratio of the main vector of the selected switching pattern is set to 100% (S11). Then, when the duty ratios Du, Dv and Dw of the respective phases are set depending on the selected main vector (S23), in a case of performing the control of the first embodiment (YES in S24), the processing ends as it is. Note that which control of the first or second embodiment is to be performed depends on a user's selective setting.

On the other hand, in a case of performing the control of the second embodiment (NO in S10), one of two vectors adjacent to the selected main vector is selected as the sub vector (S12). Then, the occurrence time $T_{main}$ of the main vector and the occurrence time $T_{sub}$ of the sub vector are calculated with Expressions (23) and (25), respectively (S13 and S14), and the duty ratios of the main vector and the sub vector are calculated (S15). When the duty ratio of the sub vector indicates a positive value (YES in S16), the selection of the sub vector is appropriate. Therefore, limit processing of the duty ratio is performed (S17), and the predicted currents $I_d(k+1)$ and $I_q(k+1)$ are recalculated with Expressions (20) and (21) (S18). Then, processing shifts to the step S23.

When the duty ratio of the sub vector indicates a negative value (NO in S16), the other of the two vectors adjacent to the main vector is selected as the sub vector (S19). Then, when processing similar to the steps S13 to S15 is performed (S20 to S22), processing shifts to the step S17.

Also, in a case of performing the control of the second embodiment in processing shown in FIG. 14 (NO in S24), duty ratios Du, Dv and Dw of respective phases are set depending on the selected sub vector (S25), and the excitation voltage $V_d$ is recalculated with Expression (26) (S26). The voltage $V_d$ is for use in position-sensorless control. Note that a torque voltage $V_q$ may be obtained also, but the torque voltage $V_q$ is actually unused.

As above, according to the second embodiment, the model prediction control unit 7 selects one switching pattern as the main vector from six space voltage vectors set every 60 degrees of electric angle, then selects one of two space voltage vectors adjacent to the main vector as the sub vector and adjusts an output time of each of the main vector and the sub vector within a switching cycle. Consequently, current ripple can be reduced more than in the control of the first embodiment.

OTHER EMBODIMENTS

An evaluation function g is not limited to Expressions (9) to (11), and an appropriate function may be selected as required.

A load on a motor is not limited to a compressor.

Several embodiments of the present invention have been described, and these embodiments are illustrated by way of examples, and are not intended to limit the scope of the invention. These novel embodiments can be implemented in various other forms, and can be variously omitted, replaced or changed without departing from the scope of the invention. The embodiments and variations are included in the scope and spirit of the present invention, and also included in the scope of the claimed invention and equivalents.

We claim:

1. A motor control device comprising:
   a power supply unit that supplies AC power to a motor to drive a load,
   a current detection unit that detects a current flowing through a winding of the motor,
   a speed and electric angle estimation unit that estimates a rotation speed and an electric angle of the motor based on a voltage outputted by the power supply unit and the current,
   a coordinate conversion unit that obtains an excitation current and a torque current based on the current and the electric angle,
   a torque current command determination unit that substitutes a predicted torque calculated based on a mechanical motion equation into a torque component current command value calculated based on a torque expression of a vector control coordinate of a permanent magnet synchronous motor, to generate a torque component current command value for bringing a difference between an inputted speed command and an estimated speed closer to zero, and
   a model prediction control unit that applies, to a plurality of predicted currents including a current change ratio determined depending on each of a plurality of switching patterns based on a space voltage vector that are able to be outputted by the power supply unit, an evaluation function to evaluate a size of a difference from a predicted current corresponding to each of the torque component current command value and an excitation component current command value inputted from outside, and that selects and outputs a switching pattern.

2. The motor control device of claim 1, wherein the model prediction control unit selects one switching pattern from eight switching patterns obtained by adding two zero vectors to six space voltage vectors set every 60 degrees of electric angle, and outputs the selected switching pattern with a duty ratio of 100% to a switching cycle.

3. The motor control device of claim 1, wherein the model prediction control unit selects, as a main vector, one switching pattern from six space voltage vectors set every 60 degrees of electric angle, then selects, as a sub vector, one of two space voltage vectors adjacent to the main vector, and
   adjusts an output time of each of the main vector and the sub vector within a switching cycle.

4. The motor control device of claim 1, wherein the torque current command determination unit uses, as a parameter to generate the torque component current command value, an integral value of an estimated speed that is obtained in a process of obtaining an estimated value of the rotation speed in the speed and electric angle estimation unit.

5. The motor control device of claim 1, wherein as the evaluation function, a function obtained by adding a squared value of a difference between the torque component current command value and a corresponding predicted current, and a squared value of a difference between the excitation component current command value and a corresponding predicted current, is used.

6. An air conditioner comprising:
   a compressor,
   a motor that drives the compressor, and
   the motor control device of claim 1.

* * * * *